E. NEWCHURCH & C. BERNARD.
LEVER STUBBLE SHAVER.
APPLICATION FILED JULY 11, 1910.
978,472.
Patented Dec. 13, 1910.
2 SHEETS—SHEET 2.
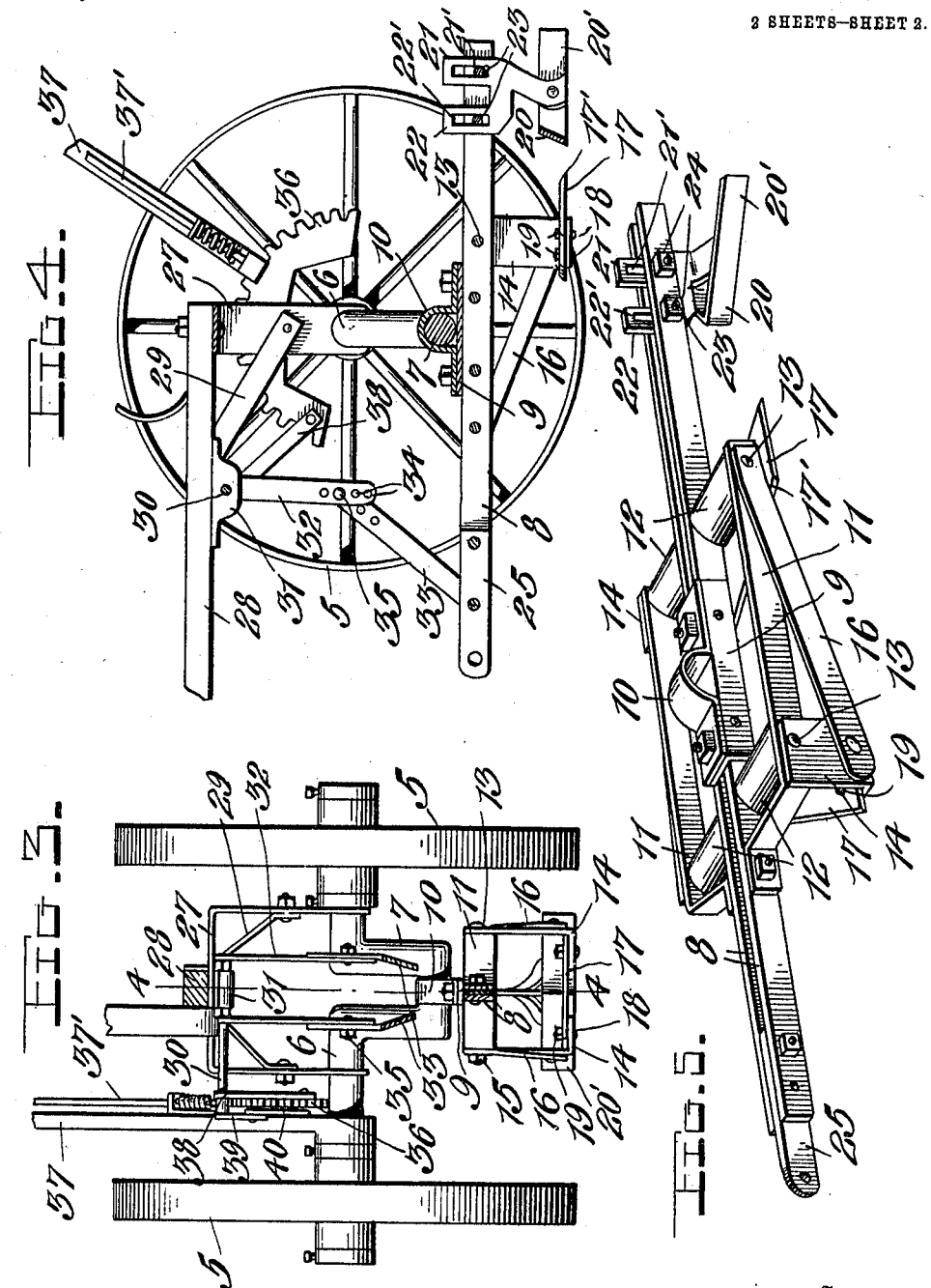
Witnesses
Chas. L. Griesbauer.
A. F. Garvey.
Inventors
E. Newchurch and
C. Bernard,
By Watson E. Coleman.
Attorney

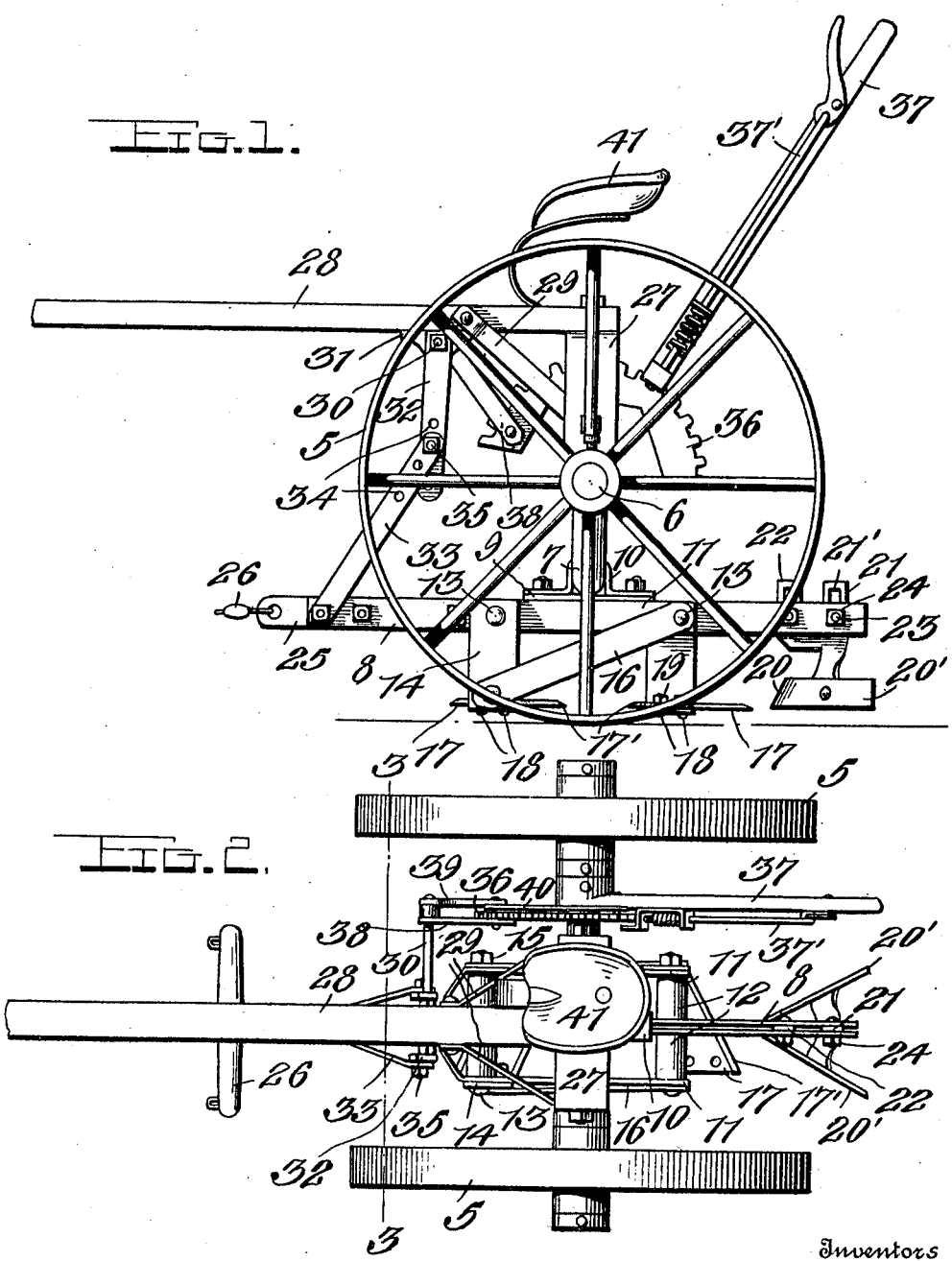

UNITED STATES PATENT OFFICE.

EDWARD NEWCHURCH AND CLAY BERNARD, OF PAINCOURTVILLE, LOUISIANA.

LEVER STUBBLE-SHAVER.

978,472.  Specification of Letters Patent.  Patented Dec. 13, 1910.

Application filed July 11, 1910. Serial No. 571,403.

*To all whom it may concern:*

Be it known that we, EDWARD NEWCHURCH and CLAY BERNARD, citizens of the United States, residing at Paincourtville, in the parish of Assumption and State of Louisiana, have invented certain new and useful Improvements in Lever Stubble-Shavers, of which the following is a specification, reference being had to the accompanying drawings.

This invention relates to an improved machine for cutting cane stubble and other growths and has for its object to provide a plurality of wheel supported vertically adjustable cutting blades whereby the stubble may be cut at any desired height above the ground.

A further object resides in the provision of a machine of the above character of comparatively simple construction and of great efficiency in operation, whereby the land may be quickly cleared of the stubble and the same directed upon opposite sides of the center of the machine.

A further object is to provide a plurality of reversible cutting blades arranged in a suitable frame, and means for adjustably mounting said frame between the ground wheels so as to position the blades parallel with the ground surface or at an angle thereto.

With these and other objects in view, the invention consists of the novel features of construction, combination and arrangement of parts hereinafter fully described and claimed, and illustrated in the accompanying drawings, in which—

Figure 1 is a side elevation of a machine constructed in accordance with our invention; Fig. 2 is a top plan view thereof; Fig. 3 is a section taken on the line 3—3 of Fig. 2; Fig. 4 is a section taken on the line 4—4 of Fig. 3; and Fig. 5 is a detail perspective view of the adjustable blade carrying frame.

Referring more particularly to the drawings 5 indicates the ground wheels which are mounted to revolve upon the ends of an axle 6. This axle is centrally formed with a crank 7 and upon this crank portion of the axle the blade carrying frame is loosely mounted.

The blade carrying frame comprises the parallel longitudinal bars 8 to which is centrally secured the angle bar 9. This angle bar extends over the upper edges of the longitudinal bars 8 and has secured thereto a plate which forms the bearing 10 through which the crank 7 of the axle extends. The frame bars 11 are arranged in spaced parallel relation to the bars 8 and are bent inwardly at one of their ends and secured to said bars. Between the bars 11 and the bars 8 a plurality of sleeves 12 are disposed through which the bolts 13 extend. Upon each of said bolts a hanger plate 14 is arranged, one of said plates being arranged on each side of the center of the machine and on opposite sides of the wheel shaft or axle. Upon the ends of the bolts 13 the nuts 15 are threaded to clamp the frame bars and the hanger plates rigidly together. A brace bar 16 is secured to the lower end of each of the hanger plates and to the frame bars 11.

The lower ends of the hanger plates are transversely disposed in opposite directions toward the center of the machine and upon these transversely disposed portions of the plates the cutting blades 17 are secured. These blades are in the form of parallelograms and are provided with two cutting edges 17'. The opposite ends of each plate are formed with openings to receive the fastening bolts 18 upon which the nuts 19 are threaded to secure the blades in operative position. Between the rear ends of the central longitudinal bars 8 an adjustable plow point 20 is arranged. This plow point is adapted to move over the surface of the ground and to direct the cut stubble, stones and other material to the opposite sides of the row to dispose the same in parallel piles so that they may be later conveniently collected and disposed of. This plow point is in the form of the diverging plates 20' to which is secured a vertical bar 21. A second bar 22 is secured to the bar 21 and diverges therefrom. These bars are longitudinally slotted as shown at 21' and 22' respectively and through these slots the bolts 23 extend. Nuts 24 are threaded on said bolts to secure the plow point in its adjusted position. The plow point may be bodily moved vertically by loosening both of the securing bolts so that the bars 21 and 22 may be moved between the bars 8. The point of the plow may be adjusted to dispose the same at any desired angle with relation to the ground surface by loosening the bolt 23 securing the bar 22 and releasing the clamping engagement of the bars 8 upon the bar 21 sufficiently to allow the bar 21 to move around the bolt 23 as a pivot, the other bar 22 being moved between the bars 8. Between the forward ends of the longitudinal bars 8 an arm 25 is secured to the forward end of which the doubletree 26 is attached.

A U-shaped frame 27 is loosely mounted upon the wheel axle on opposite sides of the crank 7 and upon the intermediate portion of this frame the forwardly extending tongue 28 is secured. Brace bars 29 connect this tongue with the lower ends of the frame 27. A shaft 30 is transversely mounted in a bearing 31 secured to one side of the tongue and upon this shaft the arms 32 are rigidly secured. Bars 33 are secured to the forward end of the longitudinal bars 8 and are adjustably connected to the arms 32, said arms and bars being provided with a plurality of openings 34 to receive the clamping bolts 35. A rack 36 is secured to one of the arms of the U-shaped frame 27 and a lever 37 is fixed upon the crank shaft 6 and carries a spring pressed locking rod 37' for engagement with the teeth of the rack. A bar 38 is secured to the forward end of said rack and supports the end of the transverse shaft 30, said shaft being rotatably mounted therein. A bar 39 is rigidly secured to the end of said shaft and is secured to a link 40 at its lower end, the other end of said link being pivoted to the lever 37. By means of this arrangement of the parts, it will be obvious that when the lever 37 is thrown forwardly or downwardly, the crank shaft 6 will be rotated in the lower ends of the U-shaped frame 27 and the wheel hubs to raise or lower the cutting blades with relation to the ground surface over which the machine moves. This adjustment may be effected while the machine is in motion. By adjusting the connection between the arms 32 and the bars 33, the blade carrying frame may be angularly positioned between the ground wheels so as to cause the cutting edges of the blade to strike the stubble or stalks and make an angular cut. The usual driver's seat 41 is mounted upon the frame 27 adjacent to the adjusting lever 37.

From the foregoing it will be seen that we have devised a machine of comparatively simple construction whereby cane stubble and other growths may be easily and quickly cut so as to clear the land for planting purposes. By providing the adjustable cutting blades and the adjustable plow point, the stubble or stalks may be cut at any desired height above the ground and disposed in rows together with stones or other material which may have collected between the cane stalks, so that the same may be conveniently and quickly collected. The machine is extremely durable in construction and may be manufactured at a comparatively low cost.

While we have shown and described the preferred embodiment of our invention, it will be understood that the same may be variously modified without departing from the essential features or sacrificing any of the advantages thereof.

We claim:—

1. The combination of a wheel supported blade carrying frame, means for adjusting said frame angularly with relation to the ground surface, means for bodily adjusting said frame vertically to raise or lower the cutting blades, and an adjustable plow point arranged in the rear end of said frame.

2. The combination of a wheel supported frame, a plurality of cutting blades secured in said frame, means for angularly positioning said frame with relation to the ground surface, means for adjusting said frame vertically to raise or lower the cutting blades, a plow point bodily movable vertically in the rear end of said frame, and means for adjusting said plow point to angularly dispose the same with relation to the ground surface.

3. The combination with an axle and ground wheels mounted thereon, said axle having a crank centrally formed therein, of a cutting blade carrying frame swingingly arranged on the crank of said axle, said frame comprising spaced central longitudinal bars, a parallel bar secured to one side of the central bars and extending in parallel relation thereto, a hanger plate secured to the last named bars at opposite ends thereof and on opposite sides of the central bars, a transversely extending cutting blade secured to the lower end of each of said hanger plates, a U-shaped frame mounted on the axle, a tongue secured on said frame, a transverse shaft rotatably mounted in a bearing on the tongue, arms secured to said shaft, bars secured to said arms and to said frame, and means for rotating said axle and the shaft to raise and lower said frame.

4. The combination with an axle and ground wheels rotatably mounted thereon, said axle having a crank centrally formed therein, of a cutting blade carrying frame, a bearing on said frame, the crank of said axle being disposed in said bearing, said frame having swinging movement on the crank, transversely disposed cutting blades carried by said frame, a U-shaped frame loosely mounted on the axle, a tongue secured to said frame, a lever fixed on the axle to rotate the same and raise and lower the frame, and movable connections between said lever and the forward end of the frame, said connections being arranged upon said tongue.

5. The combination with a crank axle and ground wheels rotatably mounted on each end thereof, of a blade carrying frame swingingly suspended from the crank of the axle, a plow point adjustably mounted in said frame rearwardly of the blades, a U- shaped frame loosely mounted on the axle on each side of the crank, a tongue secured on said frame, a rack secured to the U-shaped frame, a lever fixed on the axle carrying a spring pressed locking bolt for engagement with the teeth of the rack, a shaft rotatably mounted on the tongue, arms secured on the shaft, bars secured to the blade carrying frame and adjustably connected to said arms, and link bars connecting said shaft to the levers, said lever being adapted to rotate the axle on said shaft to raise and lower the blade carrying frame.

In testimony whereof we hereunto affix our signatures in the presence of two witnesses.

EDWARD NEWCHURCH.
CLAY BERNARD.

Witnesses:
R. H. DASSAT,
H. C. BARBIER.